United States Patent [19]

Stehr et al.

[11] 4,455,701
[45] Jun. 26, 1984

[54] METHOD OF VARYING A MANUALLY ADJUSTABLE PROGRAM COURSE OF AN AUTOMATICALLY OPERATING WASHING MACHINE

[75] Inventors: Thomas Stehr; Lieselotte Brodzina; Richard Graf, all of Berlin, Fed. Rep. of Germany

[73] Assignee: Bosch-Siemens Hausgeräte GmbH, Stuttgart, Fed. Rep. of Germany

[21] Appl. No.: 290,516

[22] Filed: Aug. 6, 1981

[30] Foreign Application Priority Data

Aug. 13, 1980 [DE] Fed. Rep. of Germany ....... 3030656

[51] Int. Cl.³ .............................................. D06F 33/02
[52] U.S. Cl. ....................................... 8/158; 68/12 R; 68/207
[58] Field of Search .................... 8/158; 68/12 R, 207; 134/57 D

[56] References Cited

U.S. PATENT DOCUMENTS

| 3,772,900 | 11/1973 | Hopkins | 68/12 R |
| 4,147,297 | 4/1979 | Worst | 68/12 R X |
| 4,159,211 | 6/1979 | Hoffman et al. | 68/12 R X |
| 4,330,081 | 5/1982 | McMillan | 68/12 R X |

FOREIGN PATENT DOCUMENTS

| 2655797 | 6/1978 | Fed. Rep. of Germany | 68/207 |
| 2658435 | 7/1978 | Fed. Rep. of Germany | 68/207 |
| 890809 | 3/1962 | United Kingdom | 68/207 |

Primary Examiner—Philip R. Coe
Attorney, Agent, or Firm—Herbert L. Lerner; Laurence A. Greenberg

[57] ABSTRACT

Automatically operating washing machines adjust the washing time, the wash water temperature and the motion, i.e. agitation, of the laundry based on predetermined cycles, such as wash, spin, or rinse, etc. An adjustable program course controls these cycles. Naturally, certain cycles require hotter or colder temperatures than others. The method of the invention varies the program course to cycles requiring hotter or colder temperature, depending on the temperature available. Therefore, if a cycle requires hot water but only cold water is available, another cycle will be chosen or the cycle will run for a shorter time. The automatically operating washing machine has at least one cold water inlet and at least one warm water inlet. The method of varying the program course includes providing an initial phase for the inflow of warm water into the machine, measuring the temperature of water admitted to the machine at the beginning of the program course after the initial inflow phase, and adjusting the program course to the initial temperature in dependence on the result of the measurement with respect to time, temperature and motion cycles for laundry.

1 Claim, 1 Drawing Figure

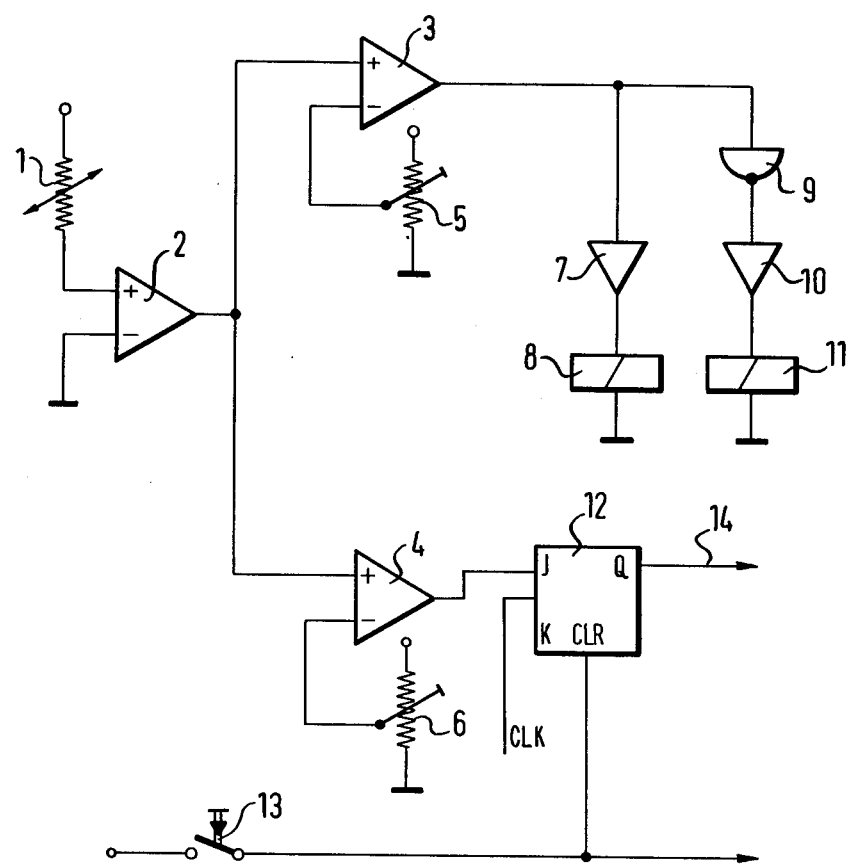

METHOD OF VARYING A MANUALLY ADJUSTABLE PROGRAM COURSE OF AN AUTOMATICALLY OPERATING WASHING MACHINE

The invention relates to a method for varying a manually adjustable program course (or sequence) of an automatically operating washing machine, which has at least one cold and one warm water inflow.

Previously known washing machines having at least one cold and warm water inflow have made their program sequence independent of the fact that more or less warm water is admitted at the beginning of the program. In German Published, Non-Prosecuted patent application DE-OS 29 51 926 it has been described that special advantages for the program sequence and for the laundry can be achieved if instead of cold water, warm water flows-in at the beginning of the program sequence or cycle.

There is accordingly a need to monitor the fact that warm water has been admitted. The obvious solution would be to monitor the flow in the warm water magnetic valve. However, this solution has the disadvantage that if the magnetic valve is incorrectly connected, or if the water is cold at the magnetic valve, an erroneous admission of warm water would be indicated.

It is accordingly an object of the invention to provide a method of varying a manually adjustable program course of an automatically operating washing machine, and a washing machine device for performing the method, which overcomes the hereinaforementioned disadvantages of the heretofore-known methods and devices of this general type.

With the foregoing and other objects in view there is provided, in accordance with the invention, a method of varying a manually adjustable program course of an automatically operating washing machine having at least one cold water inlet and at least one warm water inlet, which comprises providing an initial phase for the inflow of warm water into the machine, measuring the temperature of water admitted to the machine at the beginning of the program course after the initial inflow phase, and adjusting or adapting the set program course to the initial temperature in dependence on the result of the measurement with respect to time, temperature and motion cycles for laundry.

Because of the method according to the invention, the manufacturer of a program control device for a washing machine of the above-mentioned type has many possibilities for adjusting the program sequence, in many ways, to the respective initial temperature of the admitted water with regard to the time cycle, the temperature cycle and the motion cycles. Thus, it is possible for the first time to accurately adjust the set program sequence to the existing temperature conditions of the inflowing water, so that the program following thereafter is always optimally adjusted with respect to energy and water and washing agent use.

The method according to the invention can be especially advantageously executed in a device for performing a method of varying a manually adjustable program course of an automatically operating washing machine, comprising magnetic hot and cold water inlet valves, and a control circuit including a temperature sensor, reference value sources, first and second comparators each having an input connected to the temperature sensor, another input connected to one of the reference value sources and an output, the output of the first comparator being connected to the valves, and a bi-stable command circuit for varying the program course or sequence being connected to the output of the second comparator.

Electronically controlled washing machines are in a special way suited for the solution or application of the numerous wash-programs made possible by the variation of the different parameters. The above-described control circuit is especially suited for such an electronic control arrangement. From the determination as to whether warm or cold water is measured, it is possible to correspondingly control the magnetic cold-water or warm water valve. On the other hand, the control circuit receives corresponding commands for the program sequence, when the other comparator indicates certain temperatures which can be adjusted or pre-set by the reference-value source.

In accordance with a concomitant feature of the invention, the reference value sources connected to the comparators are adjustable in dependence on a set program course and/or in dependence on the respective phase of the program at that given time. Because of this feature, they can be easily included in the control circuit, and can be set again and again and adjusted by variable process data, either at the input of the program sequence, or during the automatic program cycle.

Other features which are considered as characteristic for the invention are set forth in the appended claims.

Although the invention is illustrated and described herein as embodied in a method of varying a manually adjustable program course of an automatically operating washing machine, and a washing machine device for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a diagrammatic and schematic circuit diagram of the control circuit part of the invention.

Referring now particularly to the single figure of the drawing, it is seen that a temperature sensor 1 is disposed at a suitable location in the washwater container of the machine, where it is best able to measure uniform mixing temperature of the admitted water. For example, this temperature sensor can contain an NTC-(negative temperature coefficient) resistance. The sensor is connected to the positive or non-inverting input of an amplifier 2, having a negative or inverting input which lies at a fixed potential. The amplified temperature measurement signal is conducted to the positive inputs of two comparators 3 and 4. The negative inputs of each of the comparators are connected to the taps of variable voltage sources 5, 6. The output of the comparator 3 controls either the magnetic-cold water valve 8 through an amplifier 7, or the magnetic-warm water valve 11 through an inverter or negator 9 and an amplifier 10.

The output of the comparator 4 is connected to an information input J of a flip-flop 12. A positive, dynamic input of the flip-flop 12 is provided for receiving a CLK (clock) signal. A start-key 13 is connected to an input CLR (clear) of the flip-flop. The output lead 14 of the flip-flop 12 conducts the command signal to the continuation of the control circuit, which is not further shown.

When the temperature sensor 1 measures a low temperature of the admitted water (such as 14° C.), the comparator 3 receives a corresponding low signal at its positive input. Comparing this signal with the signal at its negative input results, for example, in there being no signal at the output of comparator 3. Consequently, the magnetic cold-water valve 8 does not respond. However, the inverter 9 reverses or inverts this "null-signal," so that the amplifier 10 gives a control signal to the magnetic warm-water valve 11. Therefore warm water is admitted if available. Furthermore, due to the addition of warm water, the mixing temperature of the water in the washing container increases, and the temperature sensor 1 measures this higher temperature. Since a higher temperature is sensed, the amplifier 2 delivers a correspondingly greater signal at the positive input of comparator 3. If the comparison of the input signals at the comparator 3 is in favor of the temperature measurement signal, or the temperature measuring signal is greater, the output signal of the comparator 3 is amplified in the amplifier 7, and the magnetic cold water valve 8 is turned on. The inverter 9 now prevents a signal from being conducted to the magnetic warm water valve.

In this way, the reference value variable voltage source 5 prescribes or sets the temperature at which the above-described action will take place.

The output signals of the amplifier 2 are also conducted to the comparator 4. If required, the reference value source 6 of the comparator 4 can be set for another temperature, so that the signal at the output of comparator 4 goes from "null" to "1" when reaching that temperature. This transition to positive, switches the flip-flop 12 to a state in which its output lead 14 conducts the command signal. The temperature preset by the reference value source 6 can be about 30° C. for example. This informs the control circuit that warm water is being fed or offered to the magnetic warm water valve 11, and that the magnetic valve operates satisfactorily. Accordingly, the control circuit can choose a program variation which is especially advantageous when adding warm water.

The key 13 can serve as the start-key of the associated program control device, for example. The key 13 resets the flip-flop 12 again at the beginning of a program course, i.e. it sets the flip-flop back again.

With this device it is possible to measure the temperature of the admitted water at the beginning of the program after a first water inflow phase, and to adjust the set program course to the initial temperature, depending on the result of the measurement with respect to the time cycle, temperature cycle and motion cycles for the laundry.

There is claimed:

1. Method of varying a manually adjustable program course of an automatically operating washing machine having at least one cold water inlet and at least one warm water inlet, the program course controlling laundry washing time, laundry washing temperature and laundry motion cycles between a beginning and an end of the program course in dependence on the temperature of water admitted to the machine through the inlets, which comprises providing an initial phase for the inflow of warm water into the machine, measuring the temperature of water admitted to the machine at the beginning of the program course after the initial inflow phase, and adjusting the time, temperature and motion cycles of the program course in dependence on the initial temperature determined by the measurement.

* * * * *